No. 895,613. PATENTED AUG. 11, 1908.
E. W. & H. BELL.
AUTOMATIC TICKET DATING AND DELIVERING APPARATUS.
APPLICATION FILED OCT. 27, 1906.
6 SHEETS—SHEET 1.

Fig. 1

Witnesses
Inventors
E. W. Bell & H. Bell
By their Attorney
T. F. Bourn

No. 895,613. PATENTED AUG. 11, 1908.
E. W. & H. BELL.
AUTOMATIC TICKET DATING AND DELIVERING APPARATUS.
APPLICATION FILED OCT. 27, 1906.

Witnesses
Inventors
E. W. Bell and H. Bell
By their Attorney
T. F. Bourne

No. 895,613. PATENTED AUG. 11, 1908.
E. W. & H. BELL.
AUTOMATIC TICKET DATING AND DELIVERING APPARATUS.
APPLICATION FILED OCT. 27, 1906.

No. 895,613. PATENTED AUG. 11, 1908.
E. W. & H. BELL.
AUTOMATIC TICKET DATING AND DELIVERING APPARATUS.
APPLICATION FILED OCT. 27, 1906.

Witnesses
Inventor
E. W. Bell & H. Bell
By their Attorney

No. 895,613. PATENTED AUG. 11, 1908.
E. W. & H. BELL.
AUTOMATIC TICKET DATING AND DELIVERING APPARATUS.
APPLICATION FILED OCT. 27, 1906.

Witnesses
Inventors
E. W. Bell & H. Bell,
By their Attorney
T. F. Bourne

UNITED STATES PATENT OFFICE.

EDWARD WALWORTH BELL AND HAL BELL, OF NEW YORK, N. Y., ASSIGNORS, BY MESNE ASSIGNMENTS, TO AUTOMATIC CONTRACT DATING AND DELIVERY COMPANY, A CORPORATION OF NEW YORK.

AUTOMATIC TICKET DATING AND DELIVERING APPARATUS.

No. 895,613.  Specification of Letters Patent.  Patented Aug. 11, 1908.

Application filed October 27, 1906. Serial No. 340,899.

*To all whom it may concern:*

Be it known that we, EDWARD WALWORTH BELL and HAL BELL, citizens of the United States, and residents, respectively, of New York city, borough of Brooklyn, New York, and New York city, borough of the Bronx, New York, have invented certain new and useful Improvements in Automatic Ticket Dating and Delivering Apparatus, of which the following is a specification.

The object of our invention is to provide an improved apparatus wherein tickets or the like may be dated and delivered upon the operation of the mechanism controlled by the insertion of a coin or token, and our improvements are particularly useful in delivering insurance policies to the person placing the proper coin in the apparatus and then operating the same.

In carrying out our invention we provide a receptacle for containing tickets or the like, which may be properly printed in the nature of a policy of insurance, a dating or time stamp upon which the tickets are successively delivered, coin controlled means for delivering the tickets upon the stamp and imprinting upon the tickets the date or time of deposit of the coin and taking out of the ticket, and means for delivering to the insured or operator such dated ticket, all to the end that the policy ticket delivered to the purchaser or insured will bear the time at which the obligation of the insurer under the policy commences.

Our invention also embraces other novel features and combinations of parts that will be more fully hereinafter set forth and then pointed out in the claims.

Reference is to be had to the accompanying drawings forming part hereof, wherein.

Similar numerals of reference indicate corresponding parts in the several views.

Figure 7:
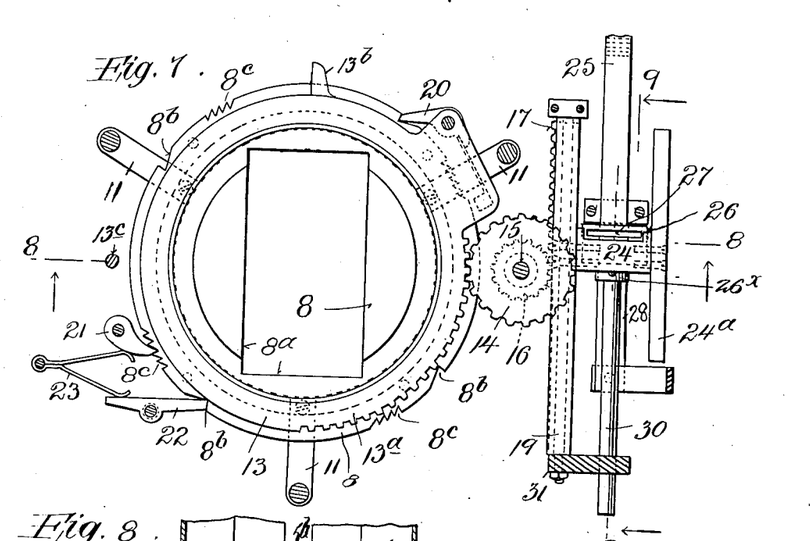
Fig. 7 is a section on the line 7, 7, in Fig. 8, illustrating the device for delivering tickets to the dating or time stamp.
Figures 8, 9:
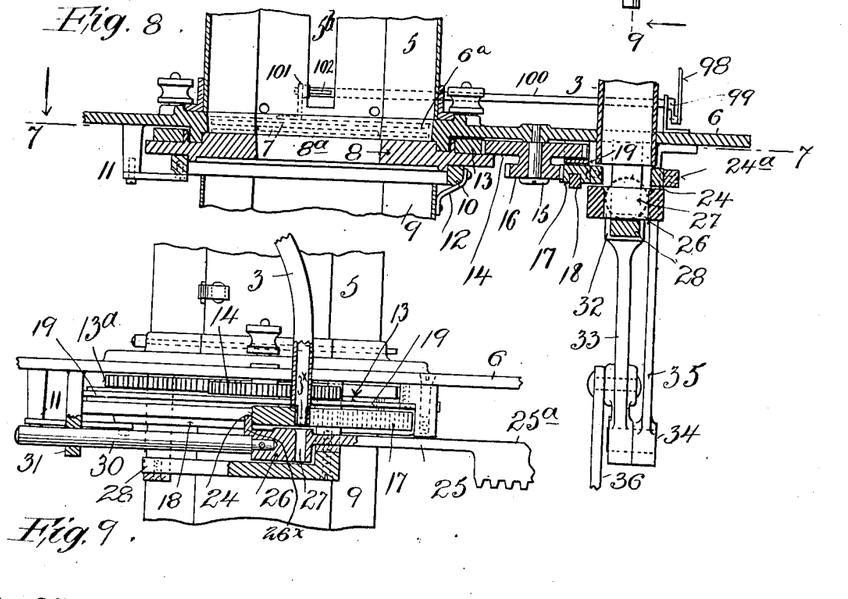
Fig. 8 is a section on the line 8, 8, in Fig. 7.
Fig. 9 is a section on the line 9, 9, in Fig. 7.

In the drawings the numeral 1 indicates, generally, a suitable frame, which may be inclosed in a casing 2, and at 3 is a coin chute leading from a slot 4 in the casing in any well known manner. At 5 is indicated a receptacle or column supported within the frame 1 in any suitable manner, and having its lower end open for the delivery of tickets, and which may be supported upon a shelf 6 within frame 1. Said receptacle may have one or more sides $5^a$ movable or hinged for the insertion of tickets. The receptacle 5 is shown, generally, in the form of a cross so that the tickets 7 contained therein may be placed successively crosswise one upon the other for convenience in successively delivering the same, and shelf 6 has an opening $6^a$ beneath receptacle 5 corresponding in shape to the latter (see Fig. 8). Beneath the receptacle 5 and shelf 6, in line with opening $6^a$, is a rotative ticket-delivering disk 8 provided with an opening $8^a$, of shape similar to the receptacle 5, so as to permit the passage therethrough successively of the tickets from said receptacle, whereby the disk 8 will support the column of tickets, yet when given a quarter rotation will permit the lowermost ticket to pass away below, as through a depending guide or chute 9 of shape similar to the receptacle 5. The ticket delivering disk 8 is shown supported to rotate upon a guide ring 10 suitably supported, as by arms 11 depending from shelf 6 (see Fig. 8), which ring 10 may also support the delivery chute 9, as by clips 12. The disk 8 is to be rotated step by step for each coin inserted for successively delivering tickets 7, and for this purpose we have shown a ring 13 guided upon disk 8 and provided with annular teeth or a rack $13^a$ meshing with a gear 14 journaled upon a screw 15 shown carried by shelf 6 and provided with a pinion 16 engaging a reciprocative rack 17 suitably supported, as between guides 18 and 19 carried by shelf 6 or frame 1. The rack 13 carries a spring pressed dog 20 (Fig. 7) adapted to engage notches $8^b$ in disk 8 located at ninety degrees apart, and said disk also has teeth $8^c$ to be engaged by a spring pressed pawl 21 suitably supported to prevent reverse motion of disk 8, and a dog 22 suitably supported may also engage the notches $8^b$ of disk 8 for the same purpose, a spring 23 acting upon said dog and pawl, but either dog or pawl may be dispensed with. By this means when the rack 13 is reciprocated the ticket delivering disk 8 will be rotated step by step a quarter turn, and thereby as its opening $8^a$ is brought into alinement with the lowermost ticket in receptacle 5 such ticket will be permitted to pass through said disk and through guiding chute 9 upon a dating or time stamp hereinafter referred to, and the solid part of disk 8, by being under the ticket next above the delivered ticket and at right angles thereto, will support the column of tickets, so that for each quarter rotation of disk 8 one or more tickets will be delivered as the tickets may be arranged for delivery in receptacle 5.

The above described ticket delivering disk and its operating devices are illustrated for the purpose of setting forth a means for delivering tickets successively from a column to a time or dating stamp for delivery therefrom to the purchaser or insured, but other well known equivalent means for successively delivering tickets may be used in connection with our invention.

Figure 4:
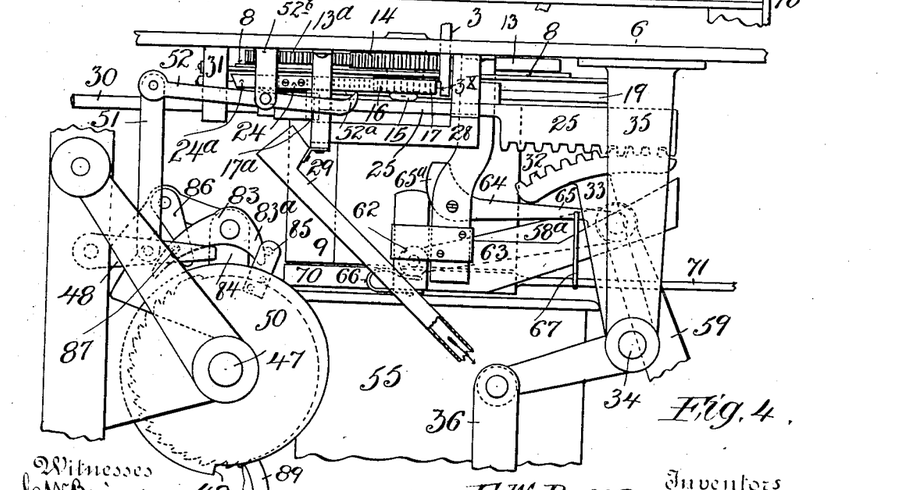
Fig. 4 is a view similar to Fig. 3, looking from the right in Fig. 1.

The reciprocation of rack 17, to control the delivery successively of tickets from receptacle 5, is controlled by the insertion of a coin in chute 3, and for this purpose we have shown the following arrangement: At 24 is an extension from rack 17, and beneath said extension is a reciprocative bar 25 having an enlargement 26 provided with a coin slot 27 adapted to aline with chute 3, and beneath said enlargement and slot is a guide 28 upon which the coin may rest and slide when delivered from chute 3 into the slot 27, in which position the coin rests on edge behind extension 24 of rack 17 so that when bar 25 is moved forwardly it will cause the coin that bears against extension 24 and passes through a side opening $3^×$ of chute 3 (Fig. 4) to push rack 17 forwardly to rotate disk 8 a quarter turn to deliver a ticket. When the coin reaches the limit of its forward travel with extension 24 it is released and will fall from slot 27 into a suitable chute 29, to be collected in a suitable receptacle. Enlargement 26 has a projection $26^×$ (Figs. 7 and 9) located in front of extension 24 to push the latter and rack 17 rearwardly after the coin passes from slot 27. Bar 25 is guided by a suitable extension or rod 30 passing through a support 31 shown carried by shelf 6, and bar 25 also has a rack $25^a$ engaging a curved rack 32 carried by a bell-crank lever 33 that is carried upon a rod or shaft 34 supported as by a hanger 35 carried by shelf 6. The opposite end of lever 33 is connected by a link 36 with an arm 37 hung loosely on a rod or shaft 38 carried by frame 1 and operated by cam 39 shown formed in the face of a disk 40 secured upon a shaft 41 journaled on frame 1, the pivot 42 connecting link 36 with arm 37 having a suitable roller 43 engaging said cam, whereby as disk 40 and its cam are rocked the rack 32 will be rocked to reciprocate bar 25.

Figure 2:
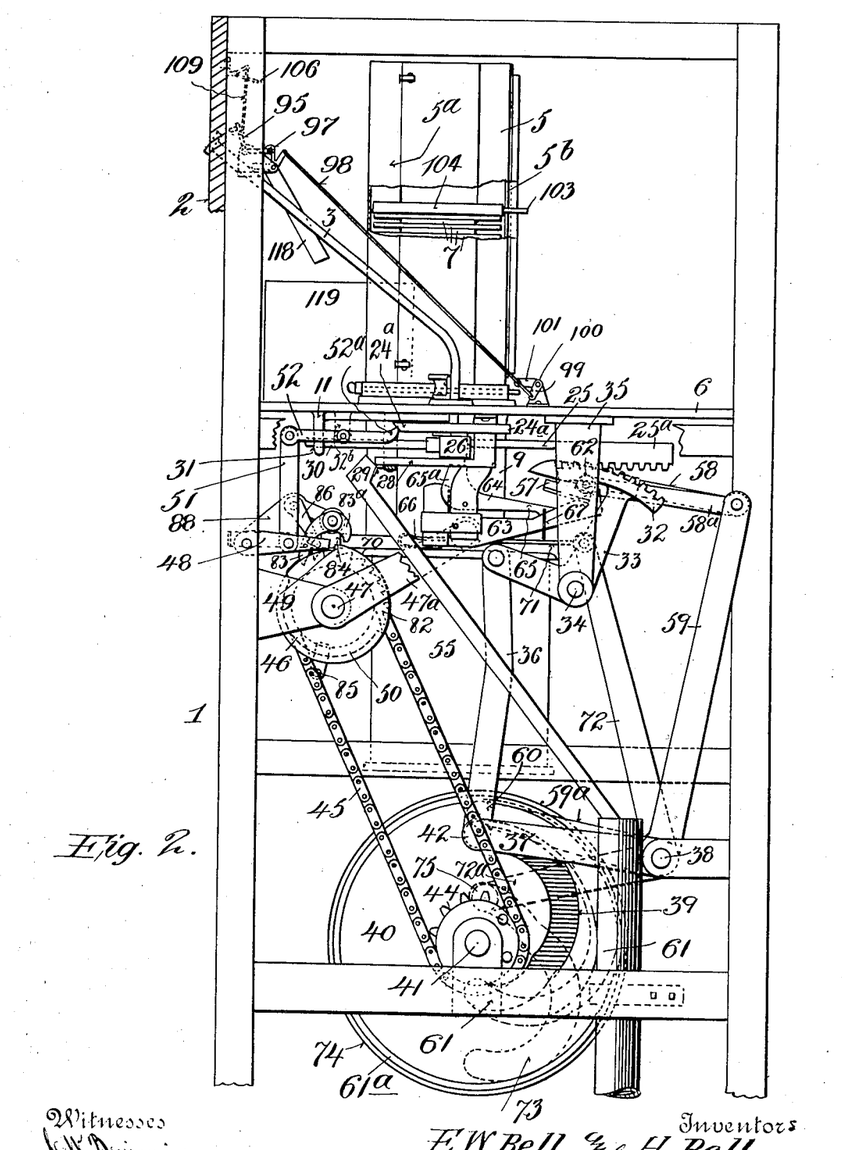
Fig. 2 is a side view thereof looking from the right in Fig. 1, partly broken.

Shaft 41 is shown provided with a sprocket wheel 44 over which a chain 45 passes to the sprocket wheel 46 carried by a crank shaft 47 journaled on frame 1, the crank arm $47^a$ of which projects out on the exterior of the casing 2 to be operated by the purchaser of the ticket, and whereby shaft 41 may be rocked. To prevent the operation of shaft 47 unless a coin be inserted in chute 3 we provide a dog 48 adapted to engage a notch or tooth 49 on a disk 50 secured on shaft 47, which in the normal position of the parts will be as shown in Fig. 2. Upon commencement of the operation dog 48 is to be lifted away from tooth 49, and for this purpose we have shown said dog pivotally connected by a link 51 with a rock-arm 52 pivotally supported upon frame 1, as upon hanger $52^b$, and having the upturned free end $52^a$ adapted to be engaged by a tripper $24^a$ shown provided with a beveled end and carried by extension 24, so that when a coin is inserted in slot 27 of bar 25, and the tripper $24^a$ first moves forwardly it will operate arm 52 to lift dog 48 free from tooth 49 to release the mechanism for operation.

The tickets delivered successively from the pile of tickets in receptacle 5, as by means of the rotative disk 8 before described, are deposited upon the printing letters and numerals of a dating or time stamp 55, that is beneath the chute 9 and supported in frame 1, as upon braces or cross bars 56, which stamp may be of any well known construction to be operated by clock works for changing the day, year, hour and minute, or suitable division of time. The pad or hammer 57 for impressing the tickets 7 upon the dating type of time stamp 55 is controlled by the coin, and in the example illustrated is supported and operated as follows: The pad 57 is connected with an arm 58 pivotally carried at the upper end of a bell-crank lever 59 shown journaled on shaft 38, the lower arm $59^a$ of which lever carries a roller 60 operated by a cam 61 which may be cut in the face of a disk $61^a$ secured on shaft 41, as indicated in Fig. 2. To the arm 58 is connected an arm $58^a$ having a roller 62 adapted to ride on a track or way 63 supported above stamp 55, and normally resting upon said track, which track inclines from an elevated position at the rear downwardly toward the top of the stamp (see Figs. 2 and 4). At 64 is a pivoted track or way having its end 65 resting upon track 63 and its forward end $65^a$ upturned and from which the roller 62 can drop when the pad 57 has passed over the dating type. By preference, we provide a spring 66 upon which roller 62 may drop, which spring is sufficiently resilient to permit the pad 57 to strike and press the ticket 7 upon the type, but which spring by its re-action will raise roller 62 and thus raise pad 57 free from the type. In the normal position the roller 62, by resting upon track 63, keeps pad 57 somewhat elevated at the rear of the dating type, but when the pad is operated to the left in Fig. 2 and passes through a slot $9^a$ in chute 9, the roller 62 will pass along track 63, thence upon track 64 and up on the end $65^a$ thereof, from which roller 62 will drop causing pad 57 to impress the ticket 7 upon the type, and on the reverse stroke roller 62 will travel up track 63, passing under track 64, and back to the normal position. Track 64 may carry a stop 67, which may be in the form of a hook, adapted to engage the underside of track 63 to limit the upward movement of track 64 by roller 62.

Figure 5:
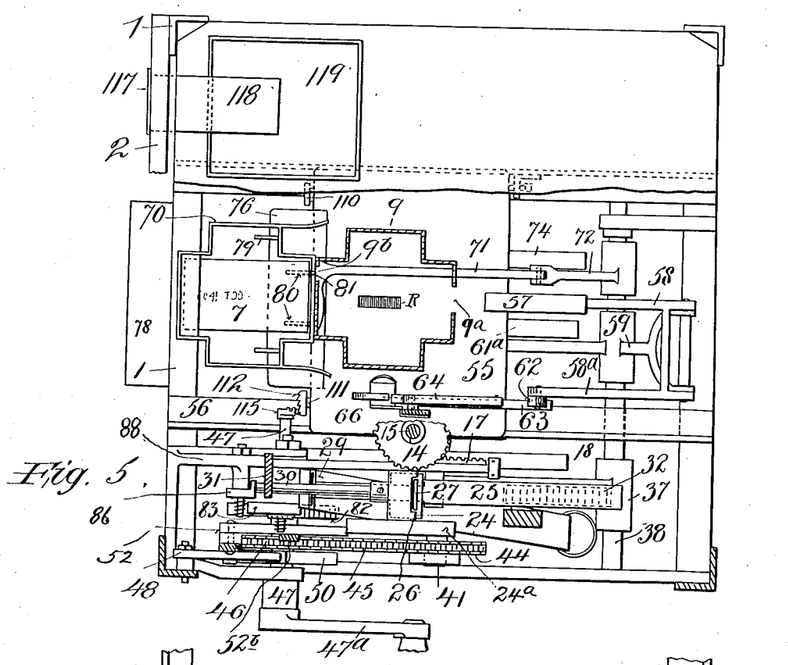
Fig. 5 is a horizontal section substantially on the line 5, 5, in Fig. 1.

After the date or time has been impressed upon ticket 7 the latter is to be discharged from over the dating stamp, and for this purpose we have shown the following arrangement:— An open frame 70, having the general shape of receptacle 5, is mounted to slide back and forth above the top of stamp 55 and beneath the discharge chute 9, so that when the tickets 7 fall from the disk 8 they will fall within said frame. The frame 70 is connected, by an extension 71, with a bell-crank lever 72 journaled loosely upon shaft 38, and operated by a cam 73 (see Fig. 2) which may be cut in the face of a disk 74 secured upon shaft 41, the lower arm $72^a$ of said lever being shown provided with a roller 75 engaging said cam. The arrangement of said cam is such, with respect to the cams 39 and 61, that in the normal position of parts the ticket-discharging frame 70 will be projected forwardly beyond the dating type of stamp 55 while the rack 25 and pad 57 are retracted, as shown in Fig. 5.

Figure 1:
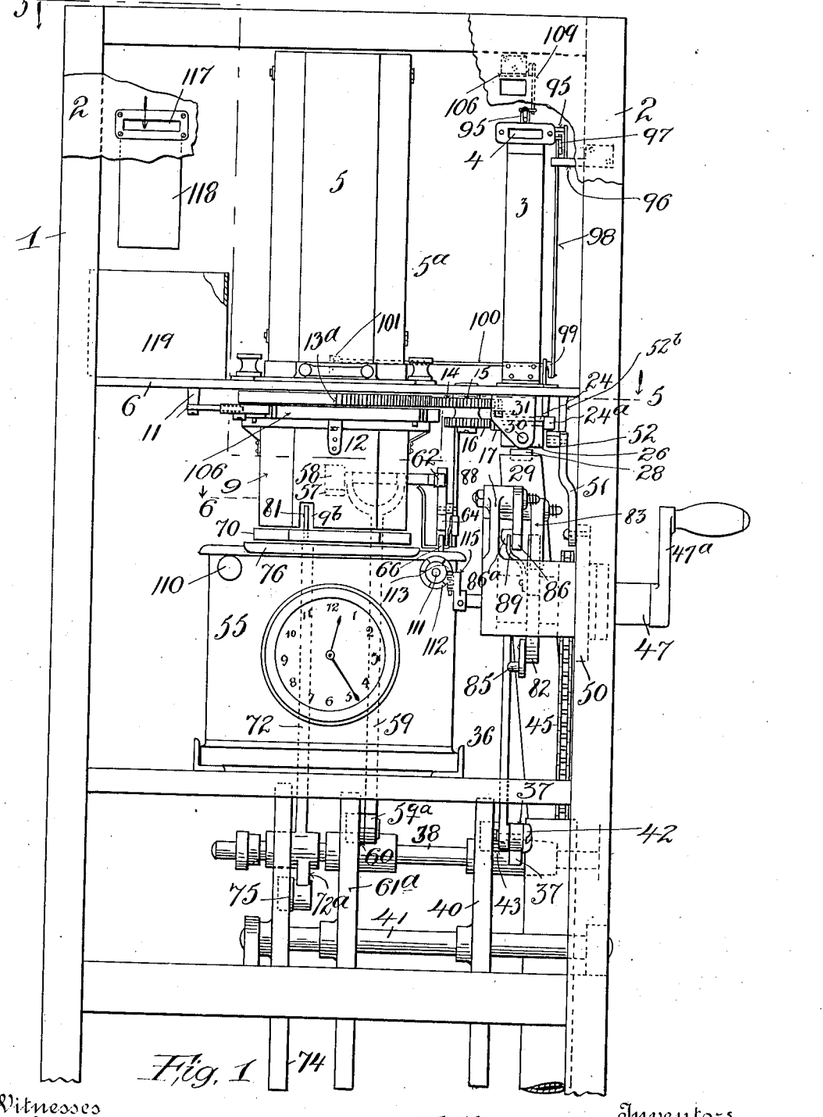
Figure 1 is a front view of an apparatus embodying our invention, most of the outer casing being removed.
Figure 3:
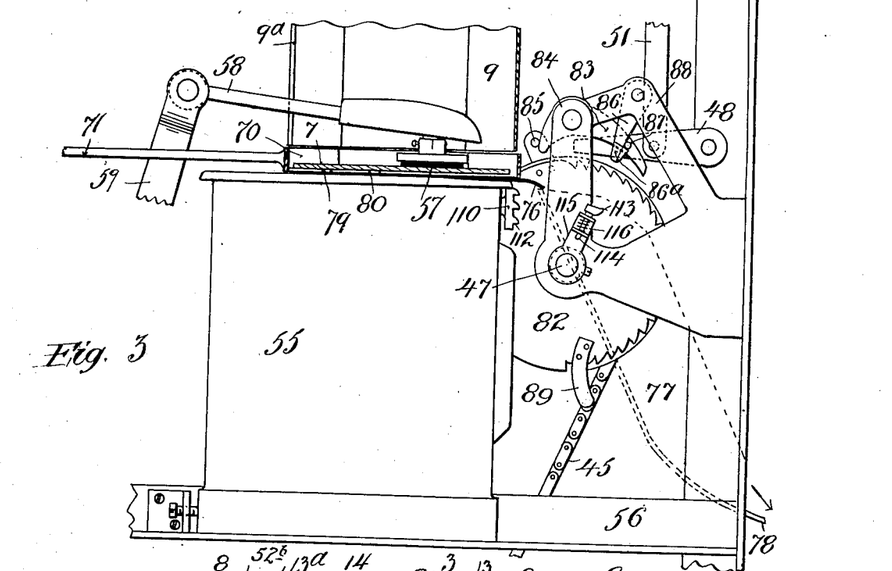
Fig. 3 is an enlarged detail view looking from the left in Fig. 1, illustrating the dating or time stamp and associate parts.
Figure 6:
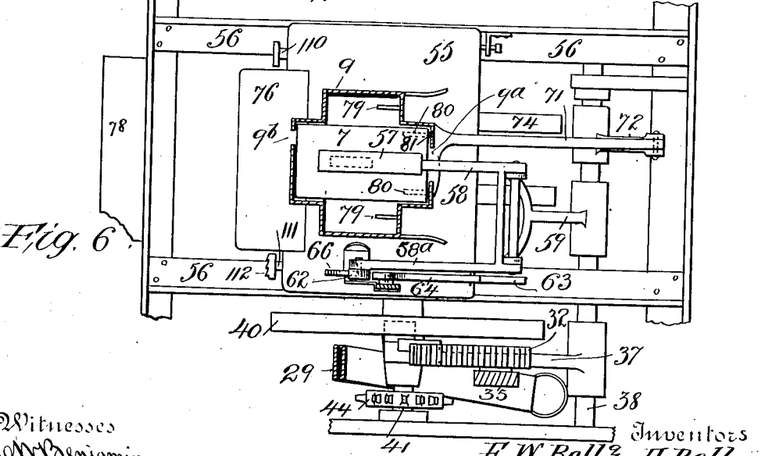
Fig. 6 is a horizontal section on the line 6, 6, in Fig. 1, parts being omitted.

The tickets 7 are stamped by pad 57 while within frame 70 and when the pad moves back said frame pushes the tickets forwardly beyond a discharge shelf or ledge 72, projected from the top of the time stamp, into a chute 77 which leads through an opening in the casing above the shelf 78 (see Figs. 3 and 6) upon which the dated tickets are to be delivered to the purchaser. To assure that the tickets will be properly delivered through the bottom of frame 70 we have shown said frame as provided at the rear with interior horizontally-disposed pins 79 and 80 upon which the inner edges of the tickets 7 rest when within said frame, and at 81 is a vertically disposed pin carried by frame 70 adapted to engage the rear edges of tickets 7 to push the same, and adapted to pass through an opening $9^b$ in the lower end of chute 9 (Fig. 1) when the frame 70 is projected forwardly.

In order to assure that the crank handle $47^a$ cannot be moved rearwardly until the completion of its forward stroke, after being released by a coin, and to permit of the return of said handle for the completion of the operation, we provide the following arrangement, viz: To the shaft 47, is rigidly connected a ratchet wheel 82 adapted to be engaged by dog 83 which resists the return movement of shaft 47, said dog being shown pivoted upon a support 84. The end $83^a$ of dog 83 is adapted to be engaged by a projection or pin 85, which may be connected with ratchet 82 in such position that when handle 47 has been moved about to the limit of its forward stroke the projection 85 will engage the end $83^a$ of said dog and lift its opposite end free from ratchet 82 (Figs. 3 and 4), in which position dog 83 will be held by a latch 86 engaging a pin 87 carried by the dog (Fig. 3), said latch being carried by support 88. Ratchet 82 also carries a projection 89 adapted to engage extension $86^a$ of latch 86 (Figs. 1 and 3) at about the limit of the return stroke of crank handle $47^a$ to release dog 83 and permit it to engage ratchet 82. With this arrangement crank handle $47^a$, after being released by dog 48, can only be moved forwardly to the limit of its stroke by reason of dog 83 engaging ratchet 82, and upon the completion of such forward stroke dog 83 is raised and remains out of engagement with ratchet 82 until the completion of the return stroke of crank handle $47^a$ to the normal position, and then the release of dog 83 from its latch 86 again permits the dog to engage ratchet 82.

Figure 10:
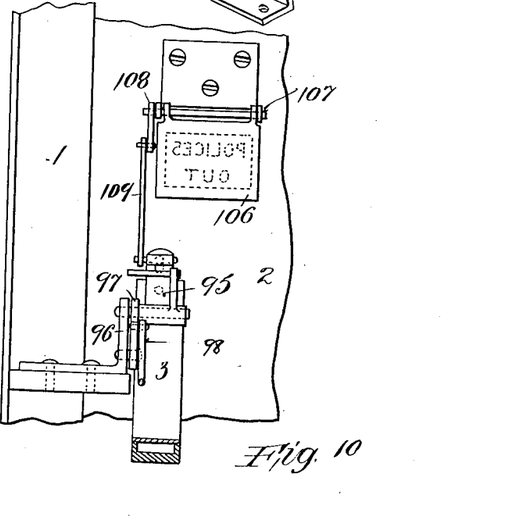
Fig. 10 is a detail view, enlarged, of means for preventing the insertion of a coin when the tickets have been exhausted, looking from the right in Fig. 1.
Figure 11:
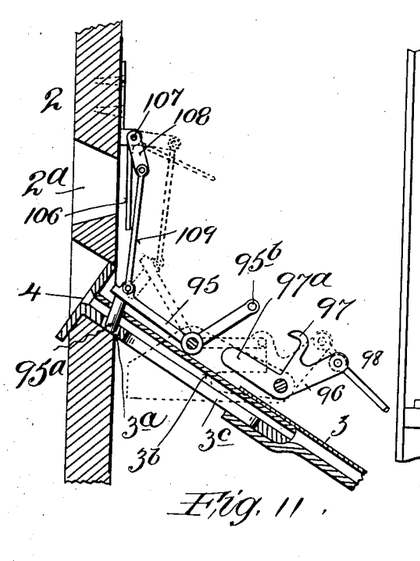
Fig. 11 is a vertical section thereof.
Figure 12:
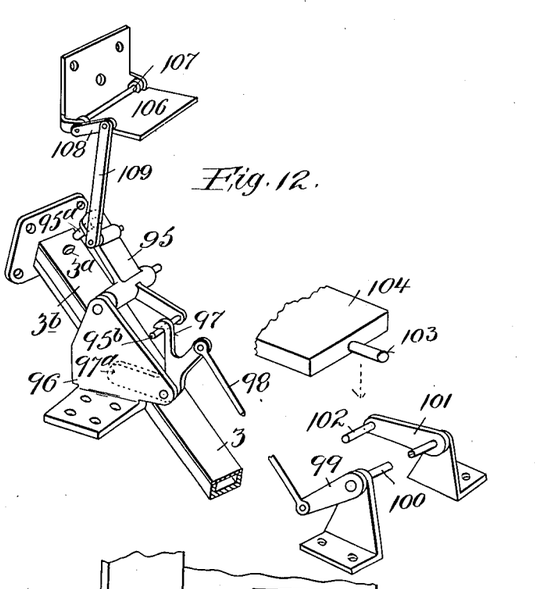
Fig. 12 is a perspective view, illustrating the parts shown in Figs. 10 and 11, partly detached.
Figure 13:
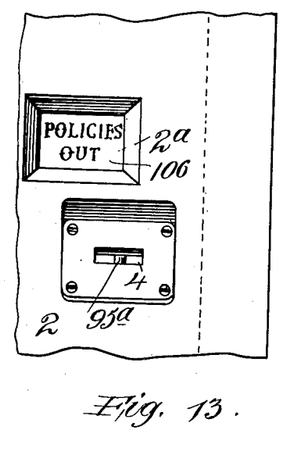
Fig. 13 is an enlarged face view of the coin slot and indicator.

We have shown means to prevent the insertion of a coin in the chute 3 when all the tickets 7 have been delivered from the machine, which are as follows: At 95 is a rock arm or bell-crank pivotally supported near the upper end of chute 3, as upon bracket 96, which arm has a pin $95^a$ adapted to pass through holes $3^a$ in chute 3, or the extension $3^b$ thereof, which extension is shown provided with a slot $3^c$ to permit false coins to fall through (see Fig. 11). At 97 is a latch shown pivoted upon support 96, and provided with a weighted part $97^a$ adapted to hold latch 97 in engagement with projection $95^b$ of arm 95, (Figs. 10, 11 and 12), to hold pin $95^a$ out of holes $3^a$. Latch 97 is pivotally connected by rod 98 with a rock arm 99 carried on a shaft 100 having an arm 101 provided with a projection 102 to be engaged by a pin 103 projecting from a weight 104 located within receptacle 5 and resting upon the tickets 7 therein, the pin 103 projecting through a vertical slot $5^b$ in receptacle 5. With the parts in the position shown in Figs. 2 and 12, and pin 103 above and out of contact with projection 102, the pin $95^a$ will be held out of the holes $3^a$, but when all or nearly all of the tickets have been delivered from receptacle 5 and weight 104 descends so that its projection 103 engages projection 102 and tilts arm 101 downwardly, the rod 98 will withdraw latch 97 from projection $95^b$ of arm 95, and thereupon said arm will tilt forwardly and its pin $95^a$ will pass into holes $3^a$ of chute 3 to prevent the insertion of coins therein, until a re-supply of tickets has been placed in receptacle 5 and weight 104 elevated. In connection with this arrangement we have also shown a drop-shutter 106 bearing a suitable visual signal, such as "Policies out", which shutter is shown pivoted upon a support 107 which may be carried by casing 2 and provided with a crank arm 108 connected by a link 109 with arm 95, in such position that when arm 95 is raised and held by latch 97, as in Fig. 12, the shutter 106 will be held up out of line with the opening $2^a$ of casing 2 (see Figs. 2 and 12), but when arm 95 is released from latch 97 the shutter 106 will swing in front of opening $2^a$ to indicate that the tickets have been sold out, while pin $95^a$ projects through holes $3^a$.

To cause the travel of the inking ribbon R across the type of the dating stamp said ribbon may be carried on spools mounted on shafts 110 and 111 of the time stamp, and the shaft 111 is shown provided with teeth 112 adapted to be engaged by a pawl or tripper 113 (see Figs. 1 and 3) carried by shaft 47 to move the ribbon forwardly step by step as shaft 47 is rocked. The tripper we have shown has a stem 114 guided in bearings on an arm 115 secured on shaft 47, a spring 116 normally pressing said tripper outwardly. When shaft 47 rotates to the left in Fig. 3 the tripper 113 will slip under teeth 112 and when said shaft is moved reversely the tripper will act on teeth 112 to cause shaft 110 to move the inking ribbon, and so on step by step. The ribbon may be reversed by rotating shaft 110 by hand.

The complete operation of our improvements may be described as follows: Tickets 7, suitably printed, as in the form of a policy of insurance, and preferably having suitable coupons, being placed crosswise in receptacle 5 in the manner indicated in Fig. 2, the lowermost ticket resting upon disk 8 reversely to its opening $8^a$ to support the pile of tickets, and the weight 104 being upon the tickets, the apparatus is ready for operation. A proper coin being inserted in the chute 3 enters slot 27 of bar 25, behind extension 24 of rack 17, and then crank handle $47^a$ is drawn forwardly by the operator, dog 48 permitting some free forward movement, and the coin thereupon causes rack 17 to advance, so that the tripper $24^a$ operates arm 52 to raise dog 48 from notch 49, giving free forward motion of handle $47^a$, and rack 17 then through the gearing will rotate disk 8 forwardly one quarter turn, whereupon handle $47^a$ will come to rest and opening $8^a$ of disk 8 will aline with the lowermost ticket 7, (in the meantime cam 74 operating the ticket discharging frame 70 to draw it back over dating stamp 55) and said ticket drops into said frame upon the dating stamp. Projection 85 thereupon acts to raise dog 83 from ratchet 82, which dog is then held up by latch 86 to permit the reverse motion of handle $47^a$, the cam $61^a$ on such forward stroke having no effect upon lever 59. Handle $47^a$ is next pushed rearwardly, whereupon cam 39 causes racks 33 and $25^a$ to move rearwardly, parts $26^\times$ and 24 pushing back rack 17 but without operating disk 8, cam 61 causes lever 59 to quickly move forward, and roller 62 of pad 57 travels on tracks 63 and 64 and falls off the end of the latter, causing pad 57 to impress a ticket upon the dating type, spring 66 immediately lifting pad 57 from the ticket, and thereupon cam 61 causes lever 59 to move back to the normal position, and during such latter time cam 73 causes lever 72 to push the ticket discharging frame 70 forwardly. When handle $47^a$ about reaches the limit of its return stroke the projection 89 engages extension $86^a$ of latch 86 to release dog 83 to prevent further operation of the apparatus. The ticket 7 pushed from the dating stamp as stated, by frame 70, falls off the ledge 76 into chute 77 and passes out of the casing upon shelf 78.

By preference the coupon portion of the ticket will have been dated by the operation above set forth, and the purchaser of the policy then tears off the coupon bearing the date and places it back in the apparatus, as through a slot 117 in the casing, which coupon may then slide through a chute 118 into a suitable receptacle 119 supported within the casing, as upon shelf 6, to be collected by the insurer. The coupon so dated and returned into the apparatus fixes or determines the date or time of taking out or issue of the policy, and the insurer is thus advised of the exact time at which each policy of insurance is issued, whereby frauds against the insurer may be detected. Policies of accident insurance delivered from a coin controlled apparatus without a date upon the returned coupon, and actually issued after an accident to a person, might be used in an endeavor to obtain indemnity for such previous accident, but this is frustrated or prevented by our invention by causing the apparatus to date each ticket or its coupon delivered therefrom, and the same applies to life, health or other insurance policies issued from the apparatus. The insured may be required to sign his name and address upon the dated coupon before returning the same into the apparatus for further identification of the insured.

Our invention is not limited to the particular arrangements of devices set forth, as the same may be varied within the scope of our invention, the main feature of which is provision for causing a ticket or its coupon, or both, to be dated within the machine before delivery therefrom to the purchaser or insured, and the return of such dated coupon or ticket to the insurer, and by the term "ticket" we mean either the ticket or ticket and its coupon as a dated contract of insurance or assurance.

Having now described our invention what we claim is:—

1. An apparatus of the character described comprising a dating stamp having its type extended upwardly and located upon a horizontal plane, and provided with means to support tickets, means for depositing tickets separately and successively upon the type of said stamp, means independent of the ticket depositing means for impressing the type upon the ticket while resting upon the stamp to indicate the time of operation, means to withdraw the impressing means from over the stamp, means for discharging the dated tickets from the apparatus, and devices for controlling the operation of the means aforesaid.

2. The combination of a dating stamp having its type extended upwardly and located upon a horizontal plane and provided with means to support tickets, means for delivering tickets separately and successively to said stamp, a pad normally held out of the path of the tickets and adapted to impress the type of said stamp upon the tickets, means to advance said pad successively over the stamp after each ticket is deposited upon said stamp, means to push dated tickets from said stamp after they are printed, and devices to control the ticket delivering means, the pad, and the ticket discharging means.

3. The combination of a dating stamp having its type extended upwardly and located upon a horizontal plane, a ticket receptacle, means for delivering tickets separately and successively from said receptacle to rest upon said dating stamp, a pad, means to cause the pad to pass between the ticket receptacle and the stamp to impress the type of said stamp upon the tickets after they are delivered to the stamp, means for discharging dated tickets from the stamp, and means to operate the same after the pad has operated upon the tickets.

4. The combination of a dating stamp having its type located on a horizontal plane to support tickets, a ticket receptacle located over said stamp, means for delivering tickets successively from said receptacle upon said dating stamp, a pad normally held out of the path of the tickets, means to cause the pad to advance over the ticket resting upon the stamp to impress the type of said stamp upon the tickets after they are delivered to the stamp, means for discharging dated tickets from the stamp, means to operate the same after the pad has operated upon the tickets, and devices for controlling the operation of the ticket delivering means, the pad, and the ticket discharging means.

5. The combination of a dating stamp, a ticket receptacle arranged to hold tickets in a column successively in order at right angles to each other, means for successively delivering tickets from said receptacle upon the dating stamp, a pad to impress the type of said stamp upon the tickets, means to operate said pad after the tickets have been placed upon the stamp respectively, means for discharging the dated tickets from the stamp, and devices for operating the ticket delivering means, the pad, and the ticket discharging means.

6. The combination of a dating stamp, means to deliver tickets successively to said stamp, a pad independent of the ticket delivering means to impress the type of said stamp upon the tickets, means to operate said pad successively after tickets have been delivered to the stamp and independently of the ticket delivering means, a frame supported to move between the stamp and the ticket receptacle, means to operate said frame after the pad has impressed the type upon the tickets, and devices to control the operation of the ticket delivering means, the pad, and the frame.

7. The combination of a dating stamp, a ticket receptacle above the stamp, means to deliver tickets successively to said stamp, a pad normally held at one side and out of the path of tickets from the receptacle adapted to impress the type of the stamp upon the tickets, a frame to discharge tickets from the stamp, and devices for controlling the operation of the ticket delivering devices, the pad, and frame.

8. The combination of a dating stamp, a ticket receptacle, means to deliver tickets successively to said stamp, a pad normally held at one side and out of the path of ticket from the receptacle adapted to impress the type of the stamp upon the tickets, a frame normally held at one side of the type of said stamp, means to draw the frame over the stamp prior to the delivery of a ticket to the stamp, and devices to cause delivery of the tickets successively to the stamp, to cause the pad to impress the type of the stamp upon the tickets successively, and to cause the frame to discharge the tickets from the stamp successively after each ticket has been dated.

9. The combination of a dating stamp, a ticket receptacle, means for delivering tickets therefrom to the stamp, a pad, a lever for operating the pad, tracks, and means between the pad and said tracks for causing the pad on its forward stroke to drop upon a ticket on the stamp, and to elevate the pad from the stamp on the reverse stroke of the pad, means for discharging dated tickets from the stamp, and devices for controlling the ticket delivering means, the pad, and the ticket discharging means.

10. The combination of a dating stamp, a ticket receptacle, means for delivering tickets therefrom to the stamp, a pad, means for reciprocating the pad, a track for holding the pad elevated from the stamp, a movable track, connections between the pad and the tracks for causing the pad to drop upon tickets from the movable track on the forward stroke and to permit the pad to resume its normal position on the return stroke, means for discharging dated tickets from the stamp, and means for controlling the ticket delivering means, the pad, and the ticket discharging means.

11. The combination of a dating stamp, a ticket receptacle, means for delivering tickets separately and successively from the receptacle to rest upon the stamp, a pad, means for reciprocating the pad, means to permit the pad to drop upon tickets on the stamp, a spring to raise the pad from a dated ticket, means to discharge dated tickets from the stamp, and means for controlling the ticket delivering means, the pad, and the ticket discharging means.

12. The combination of a dating stamp, means for delivering tickets successively thereto, a pad to impress the type of the stamp upon tickets, means to operate said pad, a frame to discharge tickets from the stamp, said frame having pins on its inner side to receive the corresponding sides of the tickets, means to reciprocate said frame, and devices to control the ticket delivering means, the pad, and the ticket discharging frame.

13. The combination of a dating stamp, means to deliver tickets thereto, a pad, means to operate said pad, means to discharge dated tickets from the stamp, and means to prevent the return stroke of said devices until the completion of their forward stroke, and then to permit their return stroke.

14. The combination of a dating stamp, means to deliver tickets thereto, a pad to operate on the tickets, means to discharge dated tickets from the stamp, an operating handle, means controlled by said handle for operating the ticket delivering means, the pad, and the ticket discharging means, a dog to prevent return movement of the handle until completion of its forward stroke, means to release said dog to permit the return stroke of the handle.

15. The combination of a dating stamp, means to deliver tickets thereto, a pad to operate on said tickets, means to discharge dated tickets from the stamp, a handle connected with said means for operating the same, ratchet teeth operated by said handle, a dog to act with said teeth to prevent return of the handle until the completion of its forward stroke, a projection operated by said handle to raise said dog at the completion of the forward stroke of the handle, a latch to hold said dog during the return stroke of the handle, and an extension connected with the handle to operate said latch to release the dog at the completion of the return stroke of the handle.

16. The combination of a dating stamp, a ticket receptacle, devices for delivering tickets from said receptacle to the stamp, a reciprocative rod connected with said devices to operate them, said rod having a rack, an arm carrying teeth to operate said rack, a cam to operate said arm, a pad to act upon tickets on the stamp, a lever connected with said pad, means to cause the pad to drop upon and recede from said tickets, a cam to operate said arm, a frame to discharge dated tickets from the stamp, an arm for operating said frame, a cam to operate said arm, a shaft carrying said cams, an operating handle, and gearing connecting said handle with said shaft.

17. The combination of a dating stamp, a ticket receptacle, devices for delivering tickets from said receptacle to the stamp, a reciprocative rod connected with said devices to operate them, said rod having a rack, an arm carrying teeth to operate said rack, a cam to operate said arm, a pad to act upon tickets on the stamp, a lever connected with said pad, means to cause the pad to drop upon and recede from said tickets, a cam to operate said arm, a frame to discharge dated tickets from the stamp, an arm for operating said frame, a cam to operate said arm, a shaft carrying said cams, an operating handle, and gearing connecting said handle with said shaft.

EDWARD WALWORTH BELL.
HAL BELL.

Witnesses:
JULIUS C. ROSENTHAL,
JOHN MOSS.